(12) United States Patent
Cheng et al.

(10) Patent No.: US 6,567,874 B1
(45) Date of Patent: May 20, 2003

(54) SIGNAL SWITCH APPARATUS

(75) Inventors: James Cheng, Taipei (TW); Meng-Hsien Liu, Taoyuan (TW)

(73) Assignee: Leadtek Research Inc., Taipei (TW)

( * ) Notice: Subject to any disclaimer, the term of this patent is extended or adjusted under 35 U.S.C. 154(b) by 0 days.

(21) Appl. No.: 09/536,778

(22) Filed: Mar. 28, 2000

(30) Foreign Application Priority Data

Aug. 24, 1999 (TW) .......................................... 88114439 A

(51) Int. Cl.[7] ............................................... G06F 13/00
(52) U.S. Cl. ........................................ 710/301; 710/260
(58) Field of Search ................................. 710/300–304, 710/260–266

(56) References Cited

U.S. PATENT DOCUMENTS 5,682,509 A * 10/1997 Kabenjian ................... 710/112
5,948,076 A * 9/1999 Anubolu et al. ............... 710/10
6,192,439 B1 * 2/2001 Grunewald et al. ......... 710/260
6,385,683 B1 * 5/2002 DeKoning et al. .......... 710/261

* cited by examiner

*Primary Examiner*—Rupal Dharia
(74) *Attorney, Agent, or Firm*—Rabin & Berdo, P.C.

(57) ABSTRACT

A signal switch apparatus includes a signal switch component, which is connected to a interrupt controller, a high level signal, and two PCI slots. Only when the SCSI card is inserted into the first PCI slot, is the interrupt signal sent by the SCSI card transmitted to the interrupt controller through the signal switch component. When the RAID card is inserted into the first PCI slot and the SCSI card is inserted into the second PCI slot, the interrupt signal sent by the SCSI card is transmitted to the RAID card through the signal switch component.

5 Claims, 4 Drawing Sheets

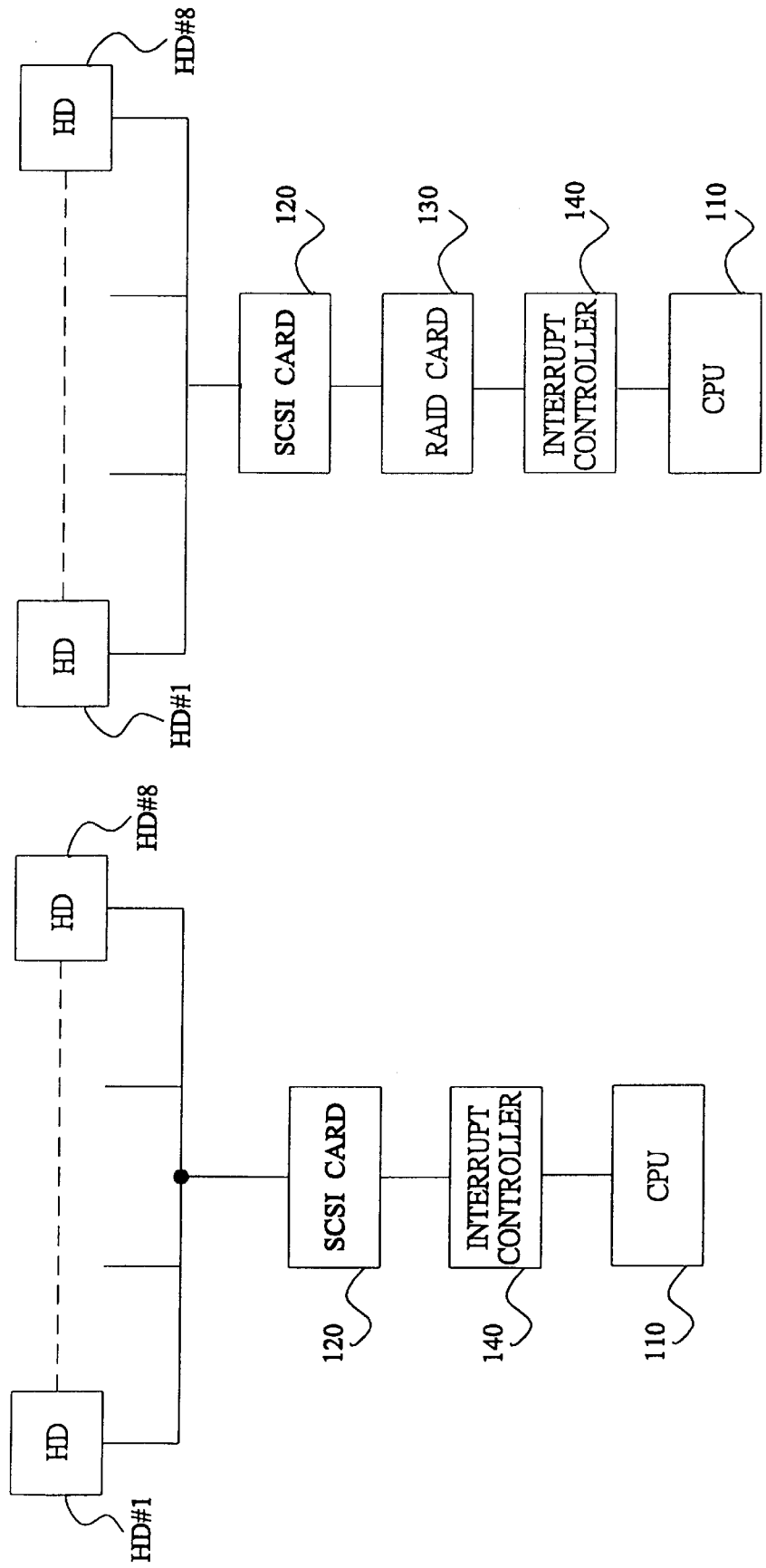

SIGNAL SWITCH APPARATUS

BACKGROUND OF THE INVENTION

This application incorporates by reference Taiwanese Application Serial No. 88114439, filed Aug. 24, 1999.

FIELD OF THE INVENTION

The invention relates in general to a signal switch apparatus, and more particularly to a signal switch apparatus which is utilized to control the interrupt signals of the small computer system interface, SCSI, card and the redundant array of independent disk, RAID, card.

DESCRIPTION OF THE RELATED ART

The development of the software is becoming more versatile and user-friendly. However, it results in the requirement of larger memory space. For supplying larger memory space, software is usually stored in a compact disk-read only memory, CD-ROM nowadays. So computer system is usually sold with a CD-ROM drive. Besides, the software is installed in the hard disk drive, HDD. Therefore, a big-storage HDD is needed to install the operation system and other software. The speed of the HDD and its transmission interface are also important for better performance.

Two interface standards of HDD are popular. One is integrated disk electronics, IDE, and the other is small computer system interface, SCSI. The transmission speed of SCSI is faster than that of IDE.

IDE interface standard is established by Compaq co. The HDD controller is integrated into HDD according to IDE. Then, the total cost is decreased. Gradually, the IDE interface standard is applied to many kinds of the peripherals such as the CD-ROM reader. IDE HDD and the IDE CD-ROM reader have become the basic peripherals of the computer.

SCSI standard is established by the American National Standards Institute, ANSI, in 1986. Utilizing the SCSI card, a number of HDD and/or the CD-ROM reader can be connected to a computer system. The SCSI card is usually inserted into the peripheral component interface, PCI, slot.

In order to improve the functions and the speed of SCSI HDD, a redundant array of independent disk, RAID, card has been developed to cooperate with the SCSI card.

Referring to FIG. 1A, when SCSI HDDs, HDD#1, HDD#2, . . . , HDD#8, are accessing data, the interrupt signal is sent by the SCSI card 120 to CPU 110 through the interrupt controller 140. Here, for the sake of illustration, the path of the interrupt signal has been simplified.

Referring to FIG. 1B, the interrupt signal sent by the SCSI card 120 is first transmitted to the RAID card 130, then sends to the interrupt controller 140 and sent to CPU 110. That is, the interrupt signal of SCSI card 120 is not sent to the interrupt controller 140 directly when the RAID card 130 is cooperated.

The RAID card is provided with several operation modes. Among them, mode 0, mode 1, mode 3, and mode 5 are often used.

High data access speed is the characteristic of mode 0. In mode 0, the bandwidth of the SCSI card is shared by HDDs. If the bandwidth of the SCSI card is 80 MB/s and that of one HDD is 20 MB/s, 4 HDDs can access data at the same time. Therefore, in mode 0, a number of HDDs can access data simultaneously through the SCSI card, which is the reason of high data access speed.

In mode 1, the mirror principle is utilized to prevent data from being lost. One of the HDDs is designated to backup data. Whenever data are written into other HDDs, data is backup to the designated HDD. While data stored in any one of the HDDs are lost, the designated HDD can be utilized to recover lost data.

In mode 3, parity bits are utilized to prevent data loss. One HDD is designated to store parity bits. Whenever data are written into other HDDs, the parity bit according to data is stored in the designated HDD. Thus, the speed of data recovering is increased. Mode 3 also has functions of mode 0.

In mode 5, parity bits are utilized to prevent data loss, too. The difference between mode 5 and mode 3 is that one HDD is designated to store parity bits in mode 3, but parity bits are stored in all HDDs in a circulating order in mode 5. Memory space for storing parity bits in each HDD is determined by algorithm. For example, whenever there are data written into HDDs, the respective parity bit is stored in the first HDD. While memory space of the first HDD for storing parity bits is full, the respective parity bit is stored in the second HDD. In this way, parity bits are stored in HDDs in a circulating order. Moreover, mode 5 also has functions of mode 0.

Referring to FIG. 2A, the SCSI card 220 is integrated into the RAID card 210, which is inserted into the PCI slot 240. Then, interrupt signals INTA#~INTD# of the RAID card 210 are sent to the interrupt controller 230.

Referring to FIG. 2B, the SCSI card 260 is separated from the RAID card 250 and is integrated into the motherboard 200. The RAID card 250 is inserted into the PCI slot 280. When a RAID card is inserted into a PCI slot, the PCI slot is called RAID upgrade bus interface, RUBI, bus. When there is no RAID card inserted into the RUBI bus, the RUBI bus can also be used as a PCI bus. Interrupt signals INTA#~INTD# are sent to the interrupt controller 270 as shown in FIG. 2B.

However, the above-mentioned two conventional ways of cooperating the RAID card and the SCSI card both have the drawback of high cost of upgrading.

As illustrated in FIG. 2A, the SCSI card 220 is integrated into the RAID card 210. Therefore, when any one of two cards is upgraded, both of two cards have to be upgraded. As a result, the cost of the hardware is high.

Similarly, in FIG. 2B, the SCSI card 260 is integrated into the motherboard 200. Therefore, when the SCSI card is upgraded, the whole motherboard 200 should be upgraded. Obviously, the high cost for upgrading the hardware is unpleasant.

SUMMARY OF THE INVENTION

It is therefore an object of the invention to provide a signal switch apparatus that can lower the cost for upgrading the SCSI card or the RAID card. Utilizing the signal switch apparatus, interrupt signals of the SCSI card can be transmitted to the interrupt controller or the RAID card according to different situations.

The invention achieves the above-identified object by providing a signal switch apparatus, which is disposed in a motherboard. The motherboard includes an interrupt controller, and two PCI slots. The signal switch apparatus includes: a signal switch component, which is connected to the interrupt controller, the first PCI slot, and the second PCI slot. When the SCSI card is inserted into the first PCI slot, the interrupt signal sent by the SCSI card is transmitted to the interrupt controller through the signal switch component.

When the SCSI card and the RAID card are respectively inserted into the first and the second PCI slots, the interrupt signal sent by the SCSI card is transmitted to the RAID card.

BRIEF DESCRIPTION OF THE DRAWINGS

Other objects, features, and advantages of the invention will become apparent from the following detailed description of the preferred but non-limiting embodiments. The description is made with reference to the accompanying drawings in which:

FIG. 1A (Prior Art) shows a block diagram of the conventional computer system utilizing the SCSI card;

FIG. 1B (Prior Art) shows a block diagram of the conventional computer system utilizing the SCSI card and the RAID card;

DESCRIPTION OF THE PREFERRED EMBODIMENT

Figure 2A:
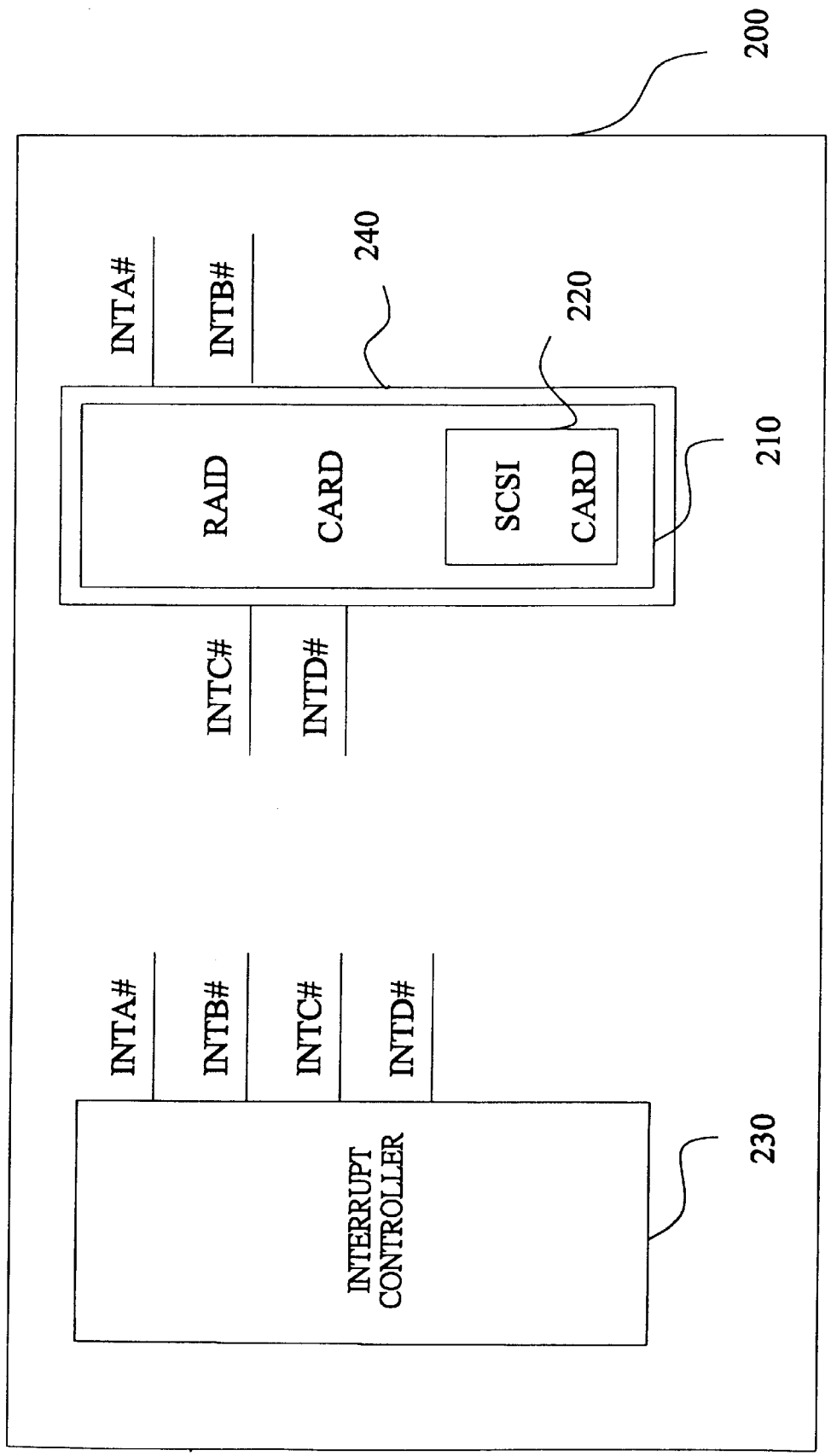
FIGS. 2A and 2B (Prior Art) shows two conventional technologies for the usage of the SCSI card and the RAID card.
Figure 2B:
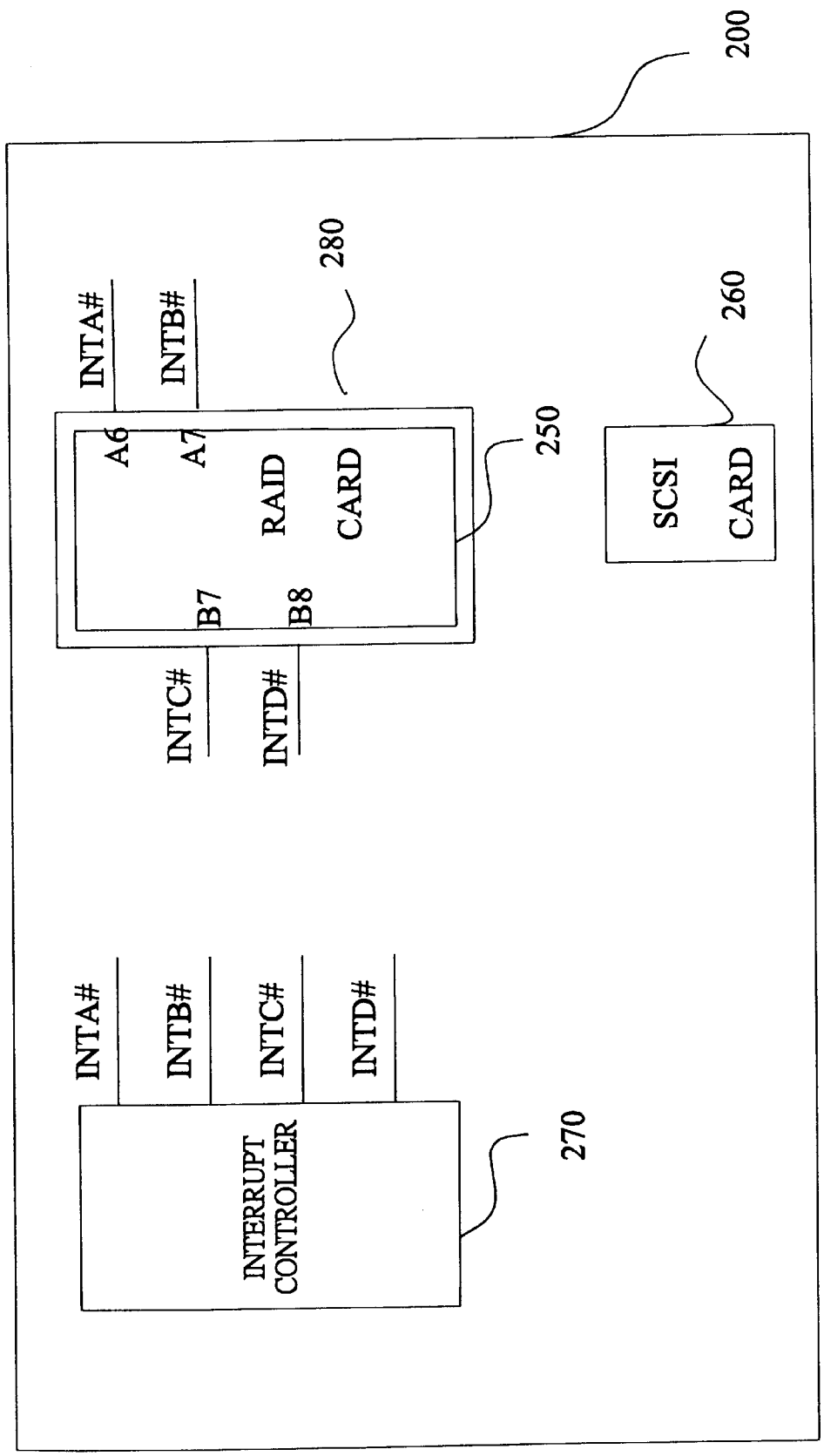
Figure 3:
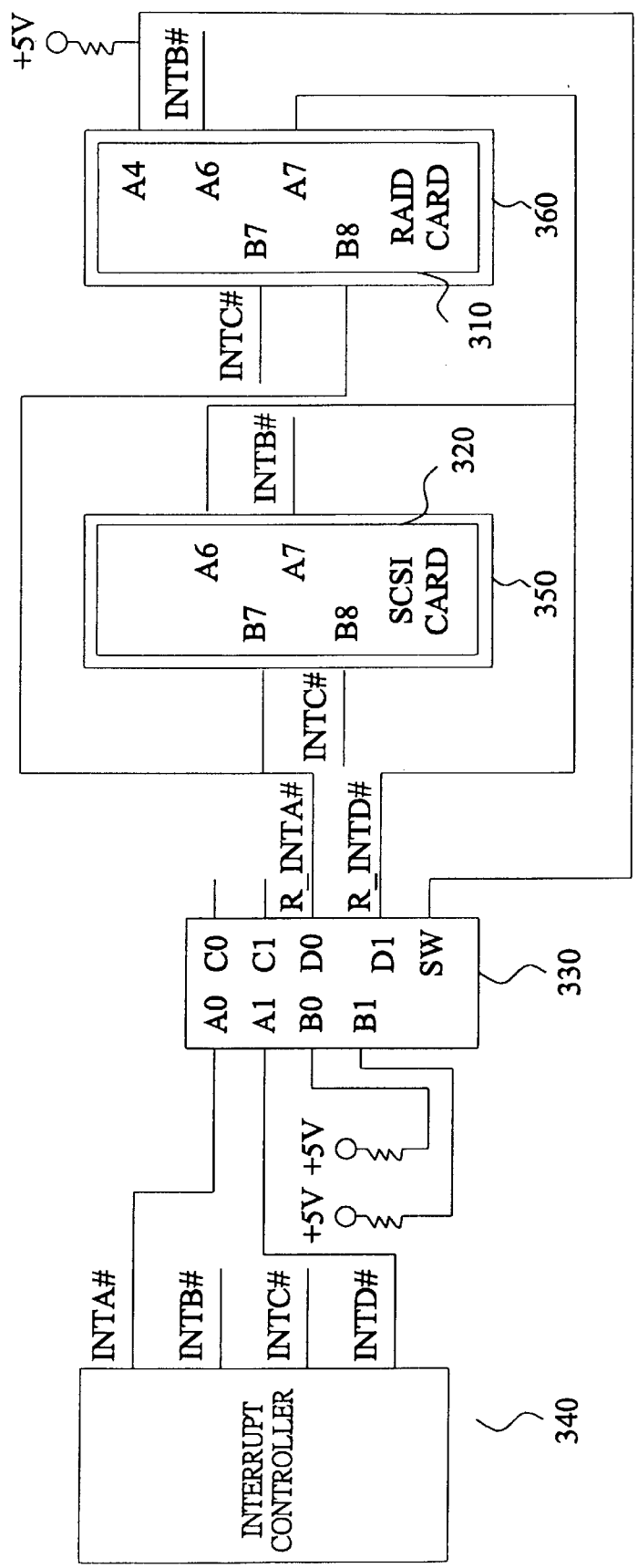
FIG. 3 shows the block diagram illustrating the signal switch apparatus according to a preferred embodiment of the invention.

Referring first to FIG. 3, a signal switch component 330 is utilized to control the flow of the interrupt signals R_INTA# and R_INTD# sent respectively by the RAID card 310 and the SCSI card 320 to the interrupt controller 340.

As shown in FIG. 3, pins of the signal switch component 330 includes A0, A1, B0, B1, C0, C1, D0, and D1. Pins D0 and D1 are used to receive interrupt signals R_INTA# and R_INTD#, respectively. Pins C0 and C1 are null. The switch signal SW can be either in the high level or in the low level.

Moreover, pins A0 and A1 of the signal switch component 330 are connected to the interrupt controller 340. Pins B0 and B1 are connected to the high level, preferably +5V.

Table 1 shows connections of pins A0, A1, B0, and B1 inside the signal switch component 330.

TABLE 1

| RAID card | SW | A0, A1 | B0, B1 |
|---|---|---|---|
| No | High level | D0, D1 | C0, C1 |
| Yes | Low level | C0, C1 | D0, D1 |

When the RAID card 310 is not inserted into the PCI slot 360, the switch signal SW is at high level. Besides, pins A0, A1, B0, and B1 are respectively connected to pins D0, D1, C0, and C1 inside the signal switch component 330. That is, the interrupt signal R_INTA# and R_INTD# sent by the SCSI card 320 are transmitted to the interrupt controller 340 through the signal switch component 330.

On the other hand, when the RAID card 310 is inserted into the PCI slot 360, the switch signal SW is at low level. Besides, pins A0, A1, B0, and B1 are connected to pins C0, C1, D0, and D1 respectively. That is, interrupt signals R_INTA# and R_INTD# sent by the SCSI card 320 is received by the RAID card 310. Besides, interrupt signals R_INTA# and R_INTD# of the signal switch component 330 are connected to the high level signal instead of the interrupt controller 340. To conclude, when the RAID card 310 is inserted into the PCI slot 360, interrupt signals R_INTA# and R_INTD# sent by the SCSI card 320 are not sent to the interrupt controller 340.

Therefore, one of the characteristics of the invention is that the signal switch component is utilized to control the path of interrupt signals sent by the SCSI card and the RAID card. When the RAID card and the SCSI card are both inserted into PCI slots, the interrupt signals sent by the SCSI.card are not transmitted to the interrupt controller. If only the SCSI card is inserted into the PCI slot, interrupt signals sent by the SCSI card are transmitted to the interrupt controller through the signal switch component.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A signal switch apparatus, which is disposed on a motherboard, wherein the motherboard comprises an interrupt controller, a first peripheral component interface, a first PCI slot, and a second PCI slot, comprising:

a signal switch component, which is connected to the interrupt controller and the first PCI slot and the second PCI slot;

wherein when a small computer system interface, SCSI, card is inserted into the first PCI slot, an interrupt signal sent by the SCSI card is connected to the interrupt controller through the signal switch component, and when the SCSI card is inserted into the first PCI slot and a redundant array of independent disk, RAID, card is inserted into the second PCI slot, the interrupt signal sent by the SCSI card is connected to the RAID card;

wherein the signal switch component comprises:

a first pin, which is connected to the first PCI slot and the second PCI slot;

a second pin, which is connected to the interrupt controller;

a third pin, which is connected to a high level signal; and a switch signal, wherein when the SCSI card is inserted into the first PCI slot and the RAID card is inserted into the second PCI slot, the switch signal is at low level, wherein when the SCSI card is inserted into the first PCI slot, the switch signal is at high level.

2. A signal switch apparatus according to claim 1, wherein the signal switch component is further connected to a high level signal.

3. A signal switch apparatus according to claim 1, wherein when the switch signal is at low level, the first pin is connected to the third pin inside the signal switch component, and wherein the interrupt signal sent by the SCSI card is connected to the high level signal and the RAID card.

4. A signal switch apparatus according to claim 1, wherein when the switch signal is at high level, the first pin is connected to the second pin, wherein the interrupt signal sent by the SCSI card is connected to the interrupt controller.

5. A signal switch apparatus according to claim 1, wherein the motherboard is a motherboard for a computer.

* * * * *